Jan. 20, 1959     F. B. HALFORD ET AL     2,869,821
BLADE RING ASSEMBLIES FOR AXIAL FLOW COMPRESSORS OR TURBINES
Filed Dec. 11, 1953     2 Sheets-Sheet 1
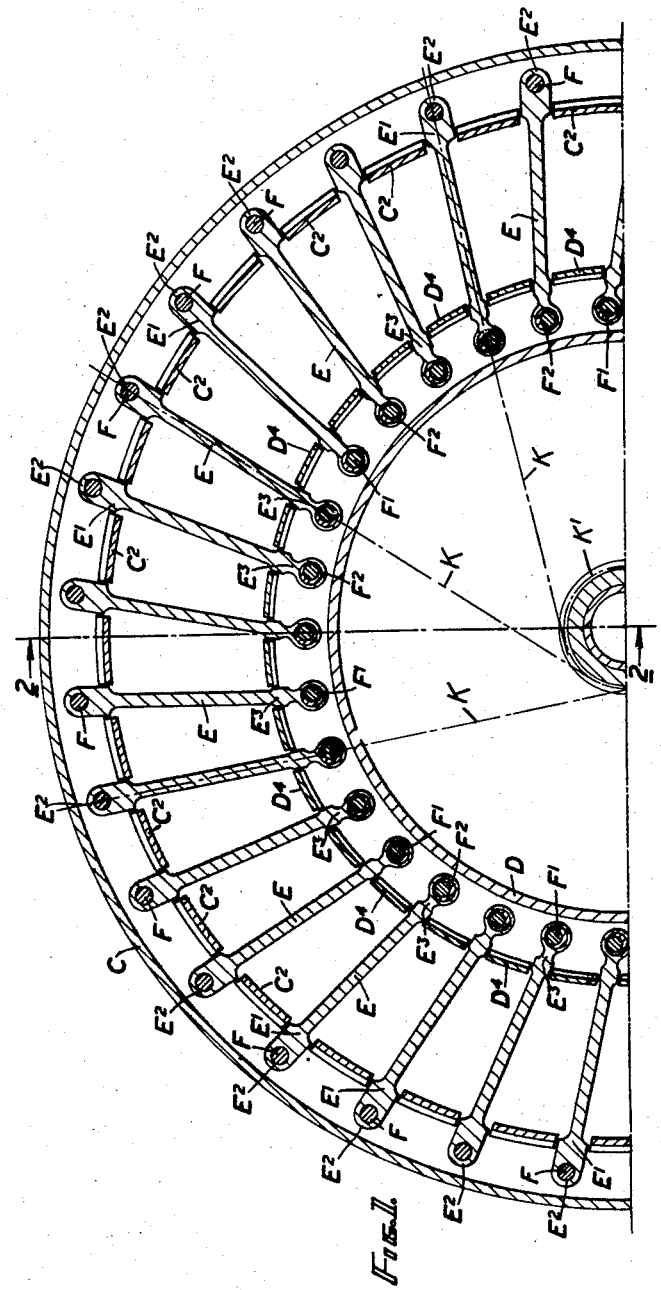
INVENTORS
FRANK B. HALFORD &
GEORGE F. CLARKE
BY
Holcombe, Wetherill & Brisebois ATTORNEYS

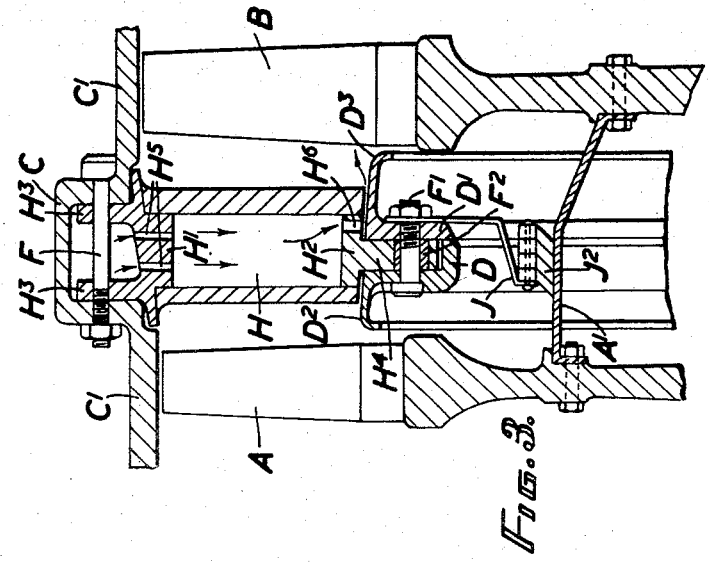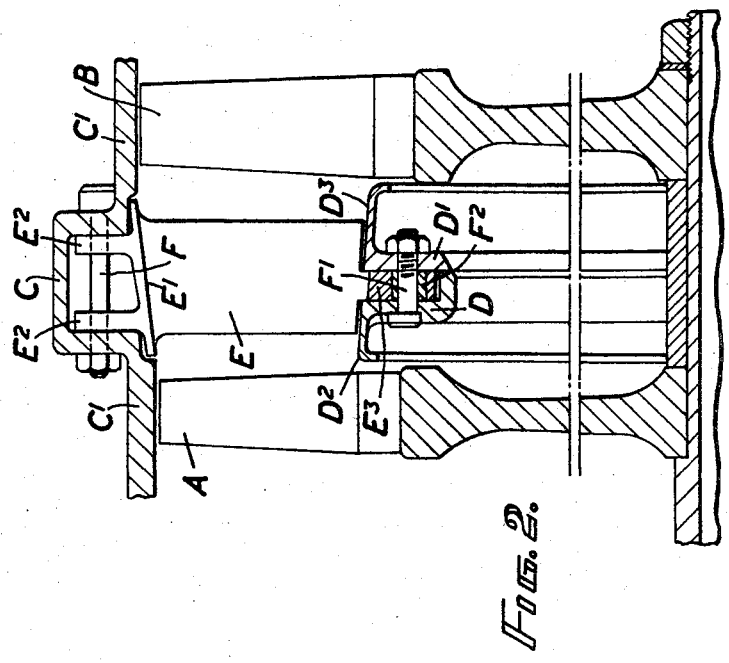

United States Patent Office 2,869,821
Patented Jan. 20, 1959

2,869,821

BLADE RING ASSEMBLIES FOR AXIAL FLOW COMPRESSORS OR TURBINES

Frank Bernard Halford, Edgware, and George Frederick Clarke, Stanmore, England, assignors to The De Havilland Engine Company Limited, Edgware, England, a British company Application December 11, 1953, Serial No. 397,752

11 Claims. (Cl. 253—78)

This invention relates to blade ring assemblies for axial flow compressors or turbines, and has for its object to provide an improved form of blade ring assembly particularly but not exclusively applicable to the interstage stator blade rings of a multi-stage turbine, the term blade ring being used to denote a ring of blades each of which extends across an annular space through which the working fluid flows.

A blade ring assembly for an axial flow compressor or turbine according to the present invention comprises concentric outer and inner blade-supporting rings and a series of blades each extending between and pivotally connected at its ends respectively to the outer supporting ring and to the inner supporting ring, each of the straight lines which lies in a plane normal to the axis of the supporting rings and passes through the axes of pivotal connection of a blade respectively to the inner and outer supporting rings being tangential to a circle having the common axis of the supporting rings for centre so that variations in the relative diameters of the supporting rings and/or in the lengths of the blades due to thermal expansion and contraction can be accommodated by limited relative rotation between the rings about their common axis.

In a preferred arrangement the longitudinal axis of each blade passes approximately through the axes of the pivotal connections by which it is connected to the inner and outer supporting rings, and the blades are formed and arranged so that the gas reaction thereon by tending to cause rotation of one supporting ring relatively to the other puts the blades into a condition of appropriate tension of compression.

Further, according to a subsidiary feature of the invention means may be provided whereby the pivotal connection between each blade and at least one of the supporting rings can have the position of its axis adjusted to a limited degree during assembly to allow for manufacturing tolerances.

The degree by which each line lying in a plane normal to the common axis of the supporting rings and passing through the axes of the pivots by which a blade is connected to the supporting rings is angularly displaced from a truly radial line passing through one or other of such pivotal axes, may vary but may conveniently be of the order of between 5° and 15°, say about 10°.

Constructional details may vary considerably but one construction of blade ring assembly according to the invention, and a modification thereof are illustrated by way of example in the accompanying drawings, in which Figure 1 is a cross-section through the blade ring assembly in a plane normal to the axis of a turbine in which the blade ring assembly is incorporated, the cross-section being in the form of a half section for convenience of illustration on an adequate scale, Figure 2 is a cross-section on the line 2—2 of Figure 1, and Figure 3 is a similar view to Figure 2 of a modification according to the invention.

In the construction illustrated, which shows the invention as applied to an inter-stage stator blade ring assembly of a multi-stage turbine, the blade ring assembly is interposed as usual between two rotor blade rings, shown respectively at A and B in Figure 2, and comprises an outer supporting ring C which, in the arrangement shown, is formed integral with the outer casing $C^1$ of the turbine, but could be formed separately therefrom and rigidly secured thereto. The outer supporting ring C is, as shown, of channel section with the open side of the channel facing radially inwards, and, lying concentrically therewith and spaced radially therefrom, is an inner supporting ring comprising two parts, D and $D^1$, rigidly secured to one another by a series of axially disposed bolts hereinafter referred to, so as together to form a channel section inner supporting ring with the open side of the channel facing outwards.

Extending between the outer and inner supporting rings is a series of blades each of which comprises a portion E constituting the blade proper, that is to say the part on which the working gases act, an outer end portion $E^1$ provided with a pair of widely spaced lugs $E^2$, and an inner end portion $E^3$ in the form of a single lug. The outer pair of lugs $E^2$ extends into the interior of the channel section outer supporting ring C so as to lie adjacent to the sides of this channel and are pivotally connected to the channel by a pivot bolt F passing through the sides of the channel and the lugs as shown, while the lug $E^3$ extends into the channel formed between the two parts of the inner supporting ring D and $D^1$ and is pivotally connected to the inner supporting ring by a bolt $F^1$ passing through the sides of the channel constituting the inner supporting ring and through a bore in a bushing $F^2$ which makes a free but close fit in a bore in the lug $E^3$. The bore of each of the bushings $F^2$ is somewhat eccentric with respect to its outer circumference, while the length of each of these bushings is such that when the bolts $F^1$ are tightened so as to clamp the two parts of the inner supporting ring D, $D^1$, firmly together, these two parts also firmly clamp the bushings $F^2$ between them so as to prevent rotation of the bushings, while the lugs $E^3$ are free to pivot about the outer circumferences of the bushings $F^2$. It will be apparent that by suitably adjusting the rotational positions of the bushings $F^2$ during assembly, allowance can be made for slight departures from the exact nominal dimensions of the parts of the assembly. As will be seen, the imaginary lines K which lie in a plane normal to the axis of the rings C and D, and which each pass through the axes of the pivotal connections between one of the blades and the inner and outer rings, are approximately tangential to an imaginary circle $K^1$ having its center on this axis. Moreover with this arrangement it will be seen that variations in the relative diameters of the rings C and D and in the lengths of the blades can take place since such variations can be accommodated merely by small relative rotational movements between the two rings.

The inner supporting ring D, $D^1$ is provided with parts $D^2$, $D^3$, which extend and lie comparatively close to the adjacent blade rings A and B of the rotor as shown so as to form in effect guides over which the gases flowing between the rings of rotor blades and the stator blade ring pass.

Moreover the inner supporting ring D, $D^1$ is formed to provide parts $D^4$ which lie between adjacent blades to form a shroud, as shown most clearly in Figure 1, so that the inner ends of the blades are in effect enclosed in an annular chamber by the shroud thus formed. Similarly, shroud pieces, $C^2$ may be associated with the outer supporting ring C as also shown in Figure 1 so as to close in the spaces between the outer end portions of the blades and thus substantially enclose these outer end portions.

In the modification shown in Figure 3 the general arrangement is similar to that shown in Figures 1 and 2 except that each blade comprises a hollow central section H and separate end portions $H^1$, $H^2$ constituting attaching members rigidly secured to the hollow central section, and attaching member $H^1$ being provided with lugs $H^3$ similar in form and function to the lugs $E^2$ in Figures 1 and 2, while the inner attaching member $H^2$ is formed to provide a lug $H^4$ similar in function and form to the lug $E^3$ in the construction shown in Figures 1 and 2. Moreover in the construction shown in Figure 3 the inner supporting ring carries an annular sealing assembly J including a series of sealing members $J^1$ which lie in close proximity to a cylindrical sealing surface $A^1$ on the part of the rotor between the rotor blade rings A and B and providing in effect a labyrinth seal between the two rotor stages.

In the arrangement shown in Figure 3, the attaching members $H^1$ and $H^2$ include passages $H^5$, $H^6$ through which respectively air can be introduced into and can escape from the interior of each hollow blade. Thus, by delivering cooling air to the interior of the outer supporting ring C air can be caused to flow through the passages $H^5$ in the outer attaching member $H^1$ of each blade, through the interior of the blade and hence through the passages $H^6$ in the inner attaching member $H^2$ and into the space immediately surrounding the inner supporting ring, from which space such air can pass over the inner portions of the rotor blades on the downstream side of the stator blade ring.

It will be apparent that the wide spacing of the lugs $E^2$ or $H^3$ on the outer ends of the blades and the wide separation of the parts of the outer supporting ring through which the bolts F pass, provides a connection between each blade and the outer supporting ring suitable for offering high resistance to movement of the blade about its longitudinal axis due to the reaction of the working gas thereon.

What we claim as our invention and desire to secure by Letters Patent is:

1. A blade ring assembly for an axial flow compressor or turbine comprising concentric outer and inner supporting rings, a circular series of pivot members supported by each of said rings arranged in pairs, one of a pair on each ring, with their pivotal axes parallel with the axis of said rings, and a series of blades each having its longitudinal axis extending angularly to any radial line through the axis of said rings and pivotally connected at its ends to the outer ring and the inner ring, respectively, by one and the other of a pair of said pivot members, said longitudinal axes of the blades being approximately tangential to an imaginary cylinder concentric with the axis of said rings, whereby variations in the relative diameters of the rings and variations in the lengths of the blades due to thermal expansion and contraction are accommodated by limited relative rotation between said rings around their common axis.

2. A blade ring assembly for an axial flow compressor or turbine as claimed in claim 1, in which the longitudinal axis of each blade passes approximately through the axes of the pivot members by which it is connected to the inner and outer rings, whereby the reaction thereon by tending to cause rotation of one ring relatively to the other puts the blades in a condition of tension or compression.

3. A blade ring assembly for an axial flow compressor or turbine as claimed in claim 1 in which the line lying in a plane normal to the axis of the rings and passing through the axes of the pivot members by which each blade is connected to the rings is angularly displaced from a radial line passing through one or other of such pivotal axes by between 5° and 15° and preferably about 10°.

4. A blade ring assembly for an axial flow compressor or turbine as claimed in claim 1 in which each blade comprises a hollow central section and attaching members rigidly secured to the ends of the central section for connecting the ends of the blades respectively to the outer and inner pivot members.

5. A blade ring assembly for an axial flow compressor or turbine as claimed in claim 4, in which one or more passages are provided in each of the attaching members to enable cooling air to be caused to flow to and from the hollow interior of each blade.

6. A blade ring assembly for an axial flow compressor or turbine as claimed in claim 1 having a rotor provided with an annular sealing surface, in which the inner supporting ring carries an annular sealing member arranged to cooperate with said annular sealing surface.

7. A blade ring assembly for an axial flow compressor or turbine as claimed in claim 1 in which the pivot members connecting each of the blades to at least one of the rings are capable of being moved to a limited degree in radial and circumferential directions relative to the axis of the rings during assembly.

8. A blade ring assembly for an axial flow compressor or turbine as claimed in claim 7 in which an eccentric cam is provided between at least one of the pivot members and at least one of the blades.

9. A blade ring assembly for an axial flow compressor or turbine as claimed in claim 1 in which the part of each blade which engages a pivot member and the outer supporting ring is of substantial length in a direction parallel to the axis of the rings such as to provide substantial resistance to twisting of the blade about its longitudinal axis.

10. A blade ring assembly as claimed in claim 1 in which the part of each blade which engages a pivot member and the outer supporting ring is of substantial length in a direction parallel to the axis of the rings such as to provide substantial resistance to twisting of the blade about its longitudinal axis and in which the longitudinal axis of each blade passes approximately through the axes of the pivotal members by which it is connected to the inner and outer supporting rings, the blades being formed and arranged so that the reaction thereon by tending to cause rotation of one of the rings relatively to the other puts the blades in a condition of tension or compression.

11. A blade ring assembly for an axial flow compressor or turbine as claimed in claim 9, in which the outer end of each blade is provided with a pair of widely spaced lugs through which pass a pivot pin connecting the outer end of the blade to the outer supporting ring and similarly passing through widely spaced parts of the outer ring.

References Cited in the file of this patent

UNITED STATES PATENTS

| | | |
|---|---|---|
| 1,067,356 | Ljungstrom | July 15, 1913 |
| 1,326,869 | Junggren | Dec. 30, 1919 |
| 2,460,778 | Willgoos | Feb. 1, 1949 |
| 2,488,867 | Judson | Nov. 22, 1949 |
| 2,671,634 | Morley | Mar. 9, 1954 |
| 2,741,455 | Hunter | Apr. 10, 1956 |

FOREIGN PATENTS

| | | |
|---|---|---|
| 404,258 | Germany | Oct. 17, 1924 |
| 807,572 | Germany | July 2, 1951 |